US009819432B2

(12) United States Patent
Makishima et al.

(10) Patent No.: US 9,819,432 B2
(45) Date of Patent: Nov. 14, 2017

(54) TRANSMISSION APPARATUS AND TRANSMISSION METHOD

(71) Applicant: FUJITSU LIMITED, Kawasaki-shi, Kanagawa (JP)

(72) Inventors: Hiromichi Makishima, Oyama (JP); Hidetaka Kawahara, Shimotsuga (JP); Shingo Hotta, Yokohama (JP); Hiroyuki Kitajima, Oyama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/094,297

(22) Filed: Apr. 8, 2016

(65) Prior Publication Data
US 2016/0337033 A1    Nov. 17, 2016

(30) Foreign Application Priority Data
May 14, 2015    (JP) ................................. 2015-099322

(51) Int. Cl.
*H04J 3/16*    (2006.01)
*H04J 3/06*    (2006.01)
(52) U.S. Cl.
CPC .......... *H04J 3/1652* (2013.01); *H04J 3/0602* (2013.01)
(58) Field of Classification Search
USPC .......................................................... 398/43
See application file for complete search history.

(56) References Cited

U.S. PATENT DOCUMENTS

| 2002/0000851 | A1* | 1/2002 | Miyazaki | G06F 1/10 327/141 |
| 2007/0104485 | A1* | 5/2007 | Zhang | H04J 14/0241 398/69 |
| 2011/0097090 | A1* | 4/2011 | Cao | H04J 3/0658 398/154 |
| 2011/0150463 | A1* | 6/2011 | Zhou | H04L 12/2865 398/25 |
| 2011/0170864 | A1* | 7/2011 | Tani | H04J 3/1652 398/43 |
| 2011/0268123 | A1* | 11/2011 | Kopelman | H04L 69/22 370/392 |
| 2015/0181316 | A1* | 6/2015 | Patel | H04Q 11/0005 398/45 |
| 2016/0105377 | A1* | 4/2016 | Nakagawa | H04L 49/253 370/392 |

FOREIGN PATENT DOCUMENTS

| JP | 2000-324076 | 11/2000 |
| JP | 2011-146917 | 7/2011 |

* cited by examiner

*Primary Examiner* — David Payne
*Assistant Examiner* — Omar S Ismail
(74) *Attorney, Agent, or Firm* — Staas & Halsey LLP

(57) ABSTRACT

A transmission apparatus includes: a generator configured to generate position information indicating a position of header information of each of a plurality of first signals from a second signal nesting the plurality of first signals; a storage configured to store the position information generated by the generator and the plurality of first signals; a monitor configured to read the position information and the plurality of first signals stored in the storage, and to monitor the header information of each of the plurality of first signals based on the position information; and an output unit configured to output the plurality of first signals after monitoring the contents of the header information.

6 Claims, 17 Drawing Sheets

FIG.5

DURING WRITING

| ADDRESS | OTU1(TS1) | | | | OTU1(TS2) | | | |
| --- | --- | --- | --- | --- | --- | --- | --- | --- |
| | DATA [7:0] | PROPERTIES | | | DATA [7:0] | PROPERTIES | | |
| | | Data Enable | Payload Enable | OH COUNT VALUE [5:0] | | Data Enable | Payload Enable | OH COUNT VALUE [5:0] |
| 0 | xx | 1 | 1 | 62 | xx | 1 | 1 | 63 |
| 1 | xx | 0 | 1 | 62 | xx | 0 | 1 | 63 |
| 2 | F6 | 1 | 0 | 0 | F6 | 1 | 0 | 1 |
| 3 | F6 | 1 | 0 | 2 | 28 | 1 | 0 | 3 |
| 4 | 28 | 1 | 0 | 4 | 28 | 1 | 0 | 5 |
| 5 | xx | 1 | 0 | 6 | xx | 1 | 0 | 7 |
| 6 | xx | 1 | 0 | 8 | xx | 1 | 0 | 9 |
| 7 | xx | 1 | 0 | 10 | xx | 1 | 0 | 11 |
| 8 | xx | 1 | 0 | 12 | xx | 1 | 0 | 13 |
| 9 | xx | 1 | 0 | 14 | xx | 1 | 0 | 15 |
| 10 | xx | 1 | 1 | 14 | xx | 1 | 1 | 15 |
| 11 | xx | 1 | 1 | 14 | xx | 1 | 1 | 15 |
| 12 | xx | 1 | 1 | 14 | xx | 1 | 1 | 15 |
| 13 | xx | 1 | 1 | 14 | xx | 1 | 1 | 15 |
| 14 | xx | 1 | 1 | 14 | xx | 1 | 1 | 15 |
| 15 | xx | 1 | 1 | 14 | xx | 1 | 1 | 15 |
| 16 | xx | 1 | 1 | 14 | xx | 1 | 1 | 15 |
| 17 | xx | 1 | 1 | 14 | xx | 1 | 1 | 15 |
| 18 | xx | 1 | 1 | 14 | xx | 1 | 1 | 15 |
| 19 | xx | 1 | 1 | 14 | xx | 1 | 1 | 15 |

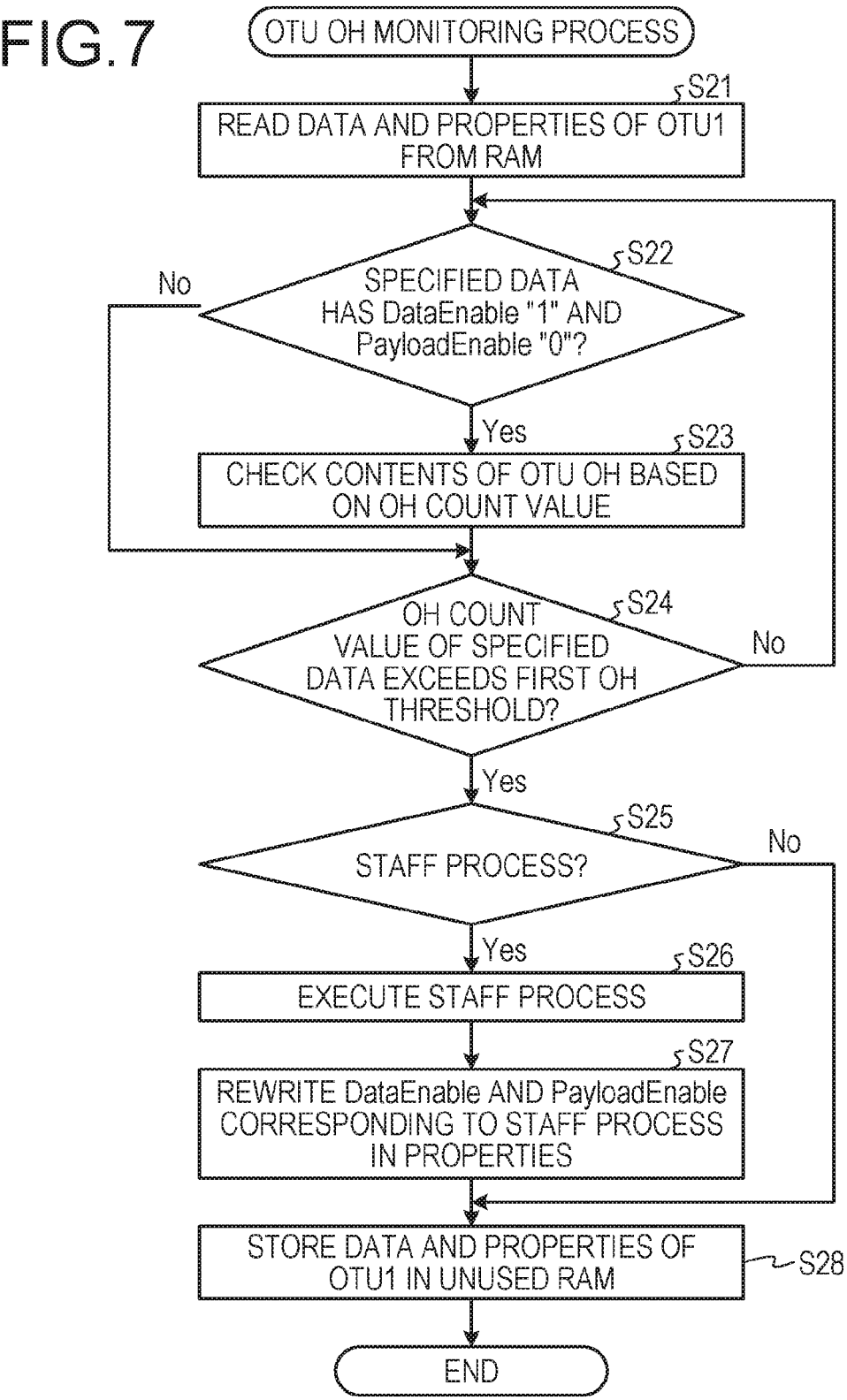

FIG.8A

DURING READING

| AD-DRESS | OTU1(TS1) DATA [7:0] | PROPERTIES Data Enable | Payload Enable | OH COUNT VALUE [5:0] | OTU1(TS2) DATA [7:0] | PROPERTIES Data Enable | Payload Enable | OH COUNT VALUE [5:0] |
|---|---|---|---|---|---|---|---|---|
| 0 | xx | 1 | 1 | 62 | xx | 1 | 1 | 63 |
| 1 | xx | 0 | 1 | 62 | xx | 0 | 1 | 63 |
| 2 | F6 | 1 | 0 | 0 | F6 | 1 | 0 | 1 |
| 3 | F6 | 1 | 0 | 2 | 28 | 1 | 0 | 3 |
| 4 | 28 | 1 | 0 | 4 | 28 | 1 | 0 | 5 |
| 5 | xx | 1 | 0 | 6 | xx | 1 | 0 | 7 |
| 6 | xx | 1 | 0 | 8 | xx | 1 | 0 | 9 |
| 7 | xx | 1 | 0 | 10 | xx | 1 | 0 | 11 |
| 8 | xx | 1 | 0 | 12 | xx | 1 | 0 | 13 |
| 9 | xx | 1 | 0 | 14 | xx | 1 | 0 | 15 |
| 10 | xx | 1 | 1 | 14 | xx | 1 | 1 | 15 |
| 11 | xx | 1 | 1 | 14 | xx | 1 | 1 | 15 |
| 12 | xx | 1 | 1 | 14 | xx | 1 | 1 | 15 |
| 13 | xx | 1 | 1 | 14 | xx | 1 | 1 | 15 |
| 14 | xx | 1 | 1 | 14 | xx | 1 | 1 | 15 |
| 15 | xx | 1 | 1 | 14 | xx | 1 | 1 | 15 |
| 16 | xx | 1 | 1 | 14 | xx | 1 | 1 | 15 |
| ⋮ | ⋮ | ⋮ | ⋮ | ⋮ | ⋮ | ⋮ | ⋮ | ⋮ |
|  | xx | 1 | 0 | 62 | xx | 1 | 0 | 63 |
| xxx | xx | 0 | 1 | 14 | xx | 0 | 1 | 15 |
|  | xx | 1 | 1 | 14 | xx | 1 | 1 | 15 |

FIG.8B

DURING WRITING

| ADDRESS | OTU1(TS1) | | | | OTU1(TS2) | | | |
|---|---|---|---|---|---|---|---|---|
| | DATA [7:0] | PROPERTIES | | OH COUNT VALUE [5:0] | DATA [7:0] | PROPERTIES | | OH COUNT VALUE [5:0] |
| | | Data Enable | Payload Enable | | | Data Enable | Payload Enable | |
| 0 | xx | 1 | 1 | 62 | xx | 1 | 1 | 63 |
| 1 | xx | 0 | 1 | 62 | xx | 0 | 1 | 63 |
| 2 | F6 | 1 | 0 | 0 | F6 | 1 | 0 | 1 |
| 3 | F6 | 1 | 0 | 2 | 28 | 1 | 0 | 3 |
| 4 | 28 | 1 | 0 | 4 | 28 | 1 | 0 | 5 |
| 5 | xx | 1 | 0 | 6 | xx | 1 | 0 | 7 |
| 6 | xx | 1 | 0 | 8 | xx | 1 | 0 | 9 |
| 7 | xx | 1 | 0 | 10 | xx | 1 | 0 | 11 |
| 8 | xx | 1 | 0 | 12 | xx | 1 | 0 | 13 |
| 9 | xx | 1 | 0 | 14 | xx | 1 | 0 | 15 |
| 10 | xx | 1 | 1 | 14 | xx | 1 | 1 | 15 |
| 11 | xx | 1 | 1 | 14 | xx | 1 | 1 | 15 |
| 12 | xx | 1 | 1 | 14 | xx | 1 | 1 | 15 |
| 13 | xx | 1 | 1 | 14 | xx | 1 | 1 | 15 |
| 14 | xx | 1 | 1 | 14 | xx | 1 | 1 | 15 |
| 15 | xx | 1 | 1 | 14 | xx | 1 | 1 | 15 |
| 16 | xx | 1 | 1 | 14 | xx | 1 | 1 | 15 |
| ⋮ | ⋮ | ⋮ | ⋮ | ⋮ | ⋮ | ⋮ | ⋮ | ⋮ |
| | xx | 1 | 0 | 62 | xx | 1 | 0 | 63 |
| xxx | xx | 0 | 1 | 14 | xx | 1 | 1 | 15 |
| | xx | 1 | 1 | 14 | xx | 1 | 1 | 15 |

FIG.10A

DURING READING

| AD-DRESS (41) | OTU1(TS1) DATA [7:0] (42) | OTU1(TS1) PROPERTIES Data Enable (43) | OTU1(TS1) PROPERTIES Payload Enable (44) | OTU1(TS1) OH COUNT VALUE [5:0] (45) | OTU1(TS2) DATA [7:0] (42) | OTU1(TS2) PROPERTIES Data Enable (43) | OTU1(TS2) PROPERTIES Payload Enable (44) | OTU1(TS2) OH COUNT VALUE [5:0] (45) |
|---|---|---|---|---|---|---|---|---|
| 0 | xx | 1 | 1 | 62 | xx | 1 | 1 | 63 |
| 1 | xx | 0 | 1 | 62 | xx | 0 | 1 | 63 |
| 2 | F6 | 1 | 0 | 0 | F6 | 1 | 0 | 1 |
| 3 | F6 | 1 | 0 | 2 | 28 | 1 | 0 | 3 |
| 4 | 28 | 1 | 0 | 4 | 28 | 1 | 0 | 5 |
| 5 | xx | 1 | 0 | 6 | xx | 1 | 0 | 7 |
| 6 | xx | 1 | 0 | 8 | xx | 1 | 0 | 9 |
| 7 | xx | 1 | 0 | 10 | xx | 1 | 0 | 11 |
| 8 | xx | 1 | 0 | 12 | xx | 1 | 0 | 13 |
| 9 | xx | 1 | 0 | 14 | xx | 1 | 0 | 15 |
| 10 | xx | 1 | 1 | 14 | xx | 1 | 1 | 15 |
| 11 | F6 | 1 | 1 | 14 | xx | 1 | 1 | 15 |
| 12 | F6 | 1 | 1 | 14 | xx | 1 | 1 | 15 |
| 13 | F6 | 1 | 1 | 0 | xx | 1 | 1 | 15 |
| 14 | 28 | 1 | 1 | 0 | xx | 1 | 1 | 15 |
| 15 | 28 | 1 | 1 | 0 | xx | 1 | 1 | 15 |
| 16 | 28 | 1 | 1 | 0 | xx | 1 | 1 | 15 |
| 17 | xx | 1 | 1 | 0 | xx | 1 | 1 | 15 |
| 18 | xx | 1 | 1 | 0 | xx | 1 | 1 | 15 |
| 19 | xx | 1 | 1 | 14 | F6 | 1 | 1 | 15 |

FIG. 10B

DURING WRITING

40

| AD-DRESS | OTU1(TS1) | | | | OTU1(TS2) | | | |
|---|---|---|---|---|---|---|---|---|
| | DATA [7:0] | PROPERTIES | | | DATA [7:0] | PROPERTIES | | |
| | | Data Enable | Payload Enable | OH COUNT VALUE [5:0] | | Data Enable | Payload Enable | OH COUNT VALUE [5:0] |
| 0 | xx | 1 | 1 | 63 | xx | 1 | 1 | 63 |
| 1 | xx | 0 | 1 | 62 | xx | 0 | 1 | 63 |
| 2 | F6 | 0 | 0 | 0 | F6 | 0 | 0 | 1 |
| 3 | F6 | 0 | 0 | 2 | 28 | 0 | 0 | 3 |
| 4 | 28 | 0 | 0 | 4 | 28 | 0 | 0 | 5 |
| 5 | xx | 0 | 0 | 6 | xx | 0 | 0 | 7 |
| 6 | xx | 0 | 0 | 8 | xx | 0 | 0 | 9 |
| 7 | xx | 0 | 0 | 10 | xx | 0 | 0 | 11 |
| 8 | xx | 0 | 0 | 12 | xx | 0 | 0 | 13 |
| 9 | xx | 0 | 0 | 14 | xx | 0 | 0 | 15 |
| 10 | xx | 1 | 1 | 63 | xx | 1 | 1 | 63 |
| 11 | F6 | 1 | 0 | 0 | xx | 1 | 1 | 63 |
| 12 | F6 | 1 | 0 | 1 | xx | 1 | 1 | 63 |
| 13 | F6 | 1 | 0 | 2 | xx | 1 | 1 | 63 |
| 14 | 28 | 1 | 0 | 3 | xx | 1 | 1 | 63 |
| 15 | 28 | 1 | 0 | 4 | xx | 1 | 1 | 63 |
| 16 | 28 | 1 | 0 | 5 | xx | 1 | 1 | 63 |
| 17 | xx | 1 | 0 | 6 | xx | 1 | 1 | 63 |
| 18 | xx | 1 | 0 | 7 | xx | 1 | 1 | 63 |
| 19 | xx | 1 | 0 | 8 | F6 | 1 | 0 | 0 |

FIG.12A

DURING READING

| AD-DRESS | OTU1(TS1) | | | | OTU1(TS2) | | | |
|---|---|---|---|---|---|---|---|---|
| | DATA [7:0] | PROPERTIES | | | DATA [7:0] | PROPERTIES | | |
| | | Data Enable | Payload Enable | OH COUNT VALUE [5:0] | | Data Enable | Payload Enable | OH COUNT VALUE [5:0] |
| 0 | xx | 1 | 1 | 63 | xx | 1 | 1 | 63 |
| 1 | xx | 0 | 1 | 62 | xx | 0 | 1 | 63 |
| 2 | F6 | 0 | 0 | 0 | F6 | 0 | 0 | 1 |
| 3 | F6 | 0 | 0 | 2 | 28 | 0 | 0 | 3 |
| 4 | 28 | 0 | 0 | 4 | 28 | 0 | 0 | 5 |
| 5 | xx | 0 | 0 | 6 | xx | 0 | 0 | 7 |
| 6 | xx | 0 | 0 | 8 | xx | 0 | 0 | 9 |
| 7 | xx | 0 | 0 | 10 | xx | 0 | 0 | 11 |
| 8 | xx | 0 | 0 | 12 | xx | 0 | 0 | 13 |
| 9 | xx | 0 | 0 | 14 | xx | 0 | 0 | 15 |
| 10 | xx | 1 | 1 | 63 | xx | 1 | 1 | 63 |
| 11 | F6 | 1 | 0 | 0 | xx | 1 | 1 | 63 |
| 12 | F6 | 1 | 0 | 1 | xx | 1 | 1 | 63 |
| 13 | F6 | 1 | 0 | 2 | xx | 1 | 1 | 63 |
| 14 | 28 | 1 | 0 | 3 | xx | 1 | 1 | 63 |
| 15 | 28 | 1 | 0 | 4 | xx | 1 | 1 | 63 |
| 16 | 28 | 1 | 0 | 5 | xx | 1 | 1 | 63 |
| 17 | xx | 1 | 0 | 6 | xx | 1 | 1 | 63 |
| 18 | xx | 1 | 0 | 7 | xx | 1 | 1 | 63 |
| 19 | xx | 1 | 0 | 8 | F6 | 1 | 0 | 0 |

FIG.12B

DURING WRITING

| AD-DRESS | OTU1(TS1) | | | | OTU1(TS2) | | | |
|---|---|---|---|---|---|---|---|---|
| | DATA [7:0] | PROPERTIES | | OH COUNT VALUE [5:0] | DATA [7:0] | PROPERTIES | | OH COUNT VALUE [5:0] |
| | | Data Enable | Payload Enable | | | Data Enable | Payload Enable | |
| 0 | xx | 1 | 1 | 63 | xx | 1 | 1 | 63 |
| 1 | xx | 0 | 1 | 62 | xx | 0 | 1 | 63 |
| 2 | F6 | 0 | 0 | 0 | F6 | 0 | 0 | 1 |
| 3 | F6 | 0 | 0 | 2 | 28 | 0 | 0 | 3 |
| 4 | 28 | 0 | 0 | 4 | 28 | 0 | 0 | 5 |
| 5 | xx | 0 | 0 | 6 | xx | 0 | 0 | 7 |
| 6 | xx | 0 | 0 | 8 | xx | 0 | 0 | 9 |
| 7 | xx | 0 | 0 | 10 | xx | 0 | 0 | 11 |
| 8 | xx | 0 | 0 | 12 | xx | 0 | 0 | 13 |
| 9 | xx | 0 | 0 | 14 | xx | 0 | 0 | 15 |
| 10 | xx | 1 | 1 | 63 | xx | 1 | 1 | 63 |
| 11 | F6 | 1 | 0 | 0 | xx | 1 | 1 | 63 |
| 12 | F6 | 1 | 0 | 1 | xx | 1 | 1 | 63 |
| 13 | F6 | 1 | 0 | 2 | xx | 1 | 1 | 63 |
| 14 | 28 | 1 | 0 | 3 | xx | 1 | 1 | 63 |
| 15 | 28 | 1 | 0 | 4 | xx | 1 | 1 | 63 |
| 16 | 28 | 1 | 0 | 5 | xx | 1 | 1 | 63 |
| 17 | xx | 1 | 0 | 6 | xx | 1 | 1 | 63 |
| 18 | xx | 1 | 0 | 7 | xx | 1 | 1 | 63 |
| 19 | xx | 1 | 0 | 8 | F6 | 1 | 0 | 0 |

TRANSMISSION APPARATUS AND TRANSMISSION METHOD

CROSS-REFERENCE TO RELATED APPLICATION

This application is based upon and claims the benefit of priority from the prior Japanese Patent Application No. 2015-099322, filed on May 14, 2015, the entire contents of which are incorporated herein by reference.

FIELD

The embodiments discussed herein are related to a transmission apparatus and a transmission method.

BACKGROUND

An optical transport network (OTN) transmission method specified in the International Telecommunication Union (TIU)-TG.709 standard is a method of transmitting client signals flowing into the optical network while storing the client signals in an optical channel transport unit (OTU). In addition to the payload storing the client signals, the OTU stores an overhead (OH) of an optical channel payload unit (OPU), an OH of an optical channel data unit (ODU), and an OH of the OTU.

In the OTN, a plurality of types of OTUs are defined capable of storing a plurality of types of client signals having different transmission rates as one signal. For example, client signals of up to about 1.25 Gbps are stored in an OTU0, and client signals of up to about 2.5 Gbps are stored in an OTU1. In addition, client signals of up to about 10 Gbps are stored in an OTU2, client signals of up to about 40 Gbps are stored in an OTU3, and client signals of up to about 100 Gbps are stored in an OTU4. Further, multiple types of ODUs are stored in the OTU.

As for the multiple types of ODUs, for example, client signals of up to about 1.25 Gbps are stored in an ODU0, and client signals of up to about 2.5 Gbps are stored in an ODU1. In addition, client signals of up to about 10 Gbps are stored in an ODU2, client signals of up to about 40 Gbps are stored in an ODU3, and client signals of up to about 100 Gbps are stored in an ODU4.

Lower-level ODUs are stored in the ODU. For example, the ODU0, ODU1, ODU2, and ODU3 are stored in the ODU4, and the ODU0, ODU1, and ODU2 are stored in the ODU3. Moreover, the ODU employs a multi-stage method capable of storing the lower-level ODUs to be nested in multiple stages. Further, the ODU which stores the lower-level ODUs is a higher order (HO)-ODU. The ODU which does not store the lower-level ODUs is a lower order (LO)-ODU. The ODU4 is obtained by, for example, multiplexing two HO-ODU2s, each storing eight LO-ODU0s, and two HO-ODU3s, each storing four LO-ODU2s.

Further, a separation unit of the transmission apparatus that conforms to the OTN separates the HO-ODU in a payload area of the received OTU and separates the data of the LO-ODU from the separated HO-ODU. Further, a multiplexing unit of the transmission apparatus stores the data of the LO-ODU in the HO-ODU, and outputs the stored HO-ODU while storing in the payload area of the OTU.

FIG. 14 is an explanatory diagram illustrating an example of a transmission system 100. The transmission system 100 illustrated in FIG. 14 includes client devices 101 of the OTU1, a network 102 of the OTU2, and a transmission apparatus 103. The transmission apparatus 103 is, for example, a transmission apparatus corresponding to OTU1×4 and OTU2×1.

The transmission apparatus 103 includes an OTU1 I/F 111, an ODU1 MUX/DMUX (Multiplexer/Demultiplexer) 112, a XC (Cross Connect) 113, an ODU processing unit 114, an ODU2 MUX/DMUX 115, and an OTU2 I/F 116. The OTU1 I/F 111 is a communication I/F between the transmission apparatus 103 and the client devices 101 of the OTU1. The OTU1 I/F 111 executes a calculation processing such as forward error correction (FEC) of the OTU1, and performs an error correction from the calculation results.

Further, the OTU1 I/F 111 detects the synchronization of an OTU OH of the OTU1. Further, the detection of the synchronization of the OH is performed by identification using a frame alignment signal (FAS) of the OTU OH of the OTU1. The OTU1 I/F 111 has an OH processing unit 111A which monitors the contents of the OTU OH while inserting the contents of the OTU OH into the OH area of the OTU1. The OH processing unit 111A has a register for each OTU1 I/F 111 to shift OTU1s to each other in order to ensure the synchronization between OTU1s of the OTU1 I/F 111. The number of OH processing units 111A is four in order to correspond to the OTU1 I/Fs 111.

The ODU1 MUX/DMUX 112 has a de-multiplex (DMUX) function of separating the data of the ODU0 which is the LO-ODU from the ODU1 which is the HO-ODU in the OTU1, and a multiplex (MUX) function of storing the data of the ODU0 in the ODU1. The XC 113 rearranges and outputs each data to a predetermined output destination on a LO-ODU basis. The ODU processing unit 114 has an OH processing unit 114A to monitor the contents of the ODU OH while inserting the ODU OH into an OH area of the ODU. The OH processing unit 114A has a register to shift data of the LO-ODUs to each other in order to ensure the synchronization between the data of the LO-ODUs on a LO-ODU basis. The number of the OH processing units 114A is eight in a total for each LO-ODU.

The ODU2 MUX/DMUX 115 has a DMUX function of separating the data of the ODU0 which is the LO-ODU from the ODU2 which is the HO-ODU, and a MUX function of storing the data of the ODU0 in the ODU2.

The OTU2 I/F 116 is a communication I/F between the transmission apparatus 103 and the network 102 of the OTU2. The OTU2 I/F 116 performs the FEC calculation processing of the OTU2, and inserts an FEC value into an FEC area of the OTU2. Further, the OTU2 I/F 116 detects the synchronization of an OTU OH of the OTU2. Further, the detection of the synchronization of the OTU OH is performed by identification using the FAS of the OTU OH of the OTU2. The OTU2 I/F 116 has an OH processing unit 116A which monitors the contents of the OTU OH while inserting the contents of the OTU OH into the OH area of the OTU2.

The OH processing unit 111A of the OTU1 I/F 111, upon receiving the OTU1 from the client device 101, checks the contents of the OTU OH of the OTU1, and then outputs the OTU1 to the ODU1 MUX/DMUX 112.

The ODU1 MUX/DMUX 112 separates the data of the ODU0 from the ODU1 in the OTU1, and outputs the separated data of the ODU0 to the XC 113. The XC 113 rearranges the data of the ODU0 from the ODU1 MUX/DMUX 112 to a predetermined output destination on a LO-ODU basis. Each OH processing unit 114A of the ODU processing unit 114 monitors the contents of the ODU OH of each ODU0. Further, each OH processing unit 114A, upon detecting a rewrite request of the ODU OH of each ODU0, rewrites a part or all of the contents of the ODU OH of each ODU0.

After the OH processing of the ODU OH of the ODU0, each OH processing unit 114A outputs the data of the ODU0 completed with the OH processing to the ODU2 MUX/DMUX 115. The ODU2 MUX/DMUX 115 stores the data of the ODU0 completed with the OH processing in the ODU2, stores the ODU2 in the payload area of the OTU2, and outputs the OTU2 to the OTU2 I/F 116.

The OH processing unit 116A of the OTU2 I/F 116 inserts the contents of the OTU OH into the OH area of the OTU2. Then, the OTU2 I/F 116 inserts the FEC value from the FEC calculation processing into the FEC area of the OTU2, and outputs the OTU2 to the network 102.

When transmitting the OTU1 of each client device 101 to the network 102 as the OTU2, the transmission apparatus 103 monitors the contents of the OTU OH of the OTU1, and then monitors and inserts the contents of the ODU OH for each LO-ODU in the OTU1. As a result, the transmission apparatus 103 stores the LO-ODU0 of each OTU1 from each client device 101 in the OTU2, and output the OTU2 to the network 102.

Upon receiving the OTU2 from the network 102 of the OTU2, the OTU2 I/F 116 identifies the FAS in the OTU OH of the OTU2 and detects the synchronization of the OTU2. Further, the OH processing unit 116A of the OTU2 I/F 116 monitors the contents of the OTU OH of the OTU2. The OTU2 I/F 116 separates the ODU2 from the payload area in the OTU2 and outputs the ODU2 to the ODU2 MUX/DMUX 115. The ODU2 MUX/DMUX 115 separates the data of the ODU0 from the ODU2 in the OTU2, and outputs the separated data of the ODU0 to the ODU processing unit 114.

Each OH processing unit 114A of the ODU processing unit 114 monitors the contents of the ODU OH of the ODU0 from the ODU2 MUX/DMUX 115 and, when rewriting the contents of the ODU OH, rewrites the contents of the ODU OH. The ODU processing unit 114 outputs the data of the OUD0 completed with the OH processing to the XC 113.

The XC 113 rearranges the data of each ODU0 from the ODU processing unit 114 to a predetermined output destination on a LO-ODU basis, and outputs the data of each ODU0 to the ODU1 MUX/DMUX 112. The ODU1 MUX/DMUX 112 stores the ODU0 from the XC 113 in the ODU1, stores the ODU1 in the payload area of the OTU1, and outputs the OTU1 to the OTU1 I/F 111. The OTU1 I/F 111 stores the ODU1 from the ODU1 MUX/DMUX 112 in the payload area of the OTU1, and inserts the contents of the OTU OH into the OH area of the OTU1. Further, the OTU1 I/F 111 FEC calculates the OTU1, and inserts the FEC value into the FEC area in the OTU1. Then, the OTU1 I/F 111 outputs the OTU1 to the client device 101.

When transmitting the OTU2 from the network 102 to each client device 101, the transmission apparatus 103 monitors the OTU OH of the OTU2, and then monitors and inserts the contents of the ODU OH for each LO-ODU in the OTU2. As a result, the transmission apparatus 103 separates the OTU2 from the network 102 into the OTU1, and outputs the OTU1 to each client device 101.

Related techniques are disclosed in, for example, Japanese Laid-Open Patent Publication No. 2011-146917.

SUMMARY

According to an aspect of the invention, a transmission apparatus includes: a generator configured to generate position information indicating a position of header information of each of a plurality of first signals from a second signal nesting the plurality of first signals; a storage configured to store the position information generated by the generator and the plurality of first signals; a monitor configured to read the position information and the plurality of first signals stored in the storage, and to monitor the header information of each of the plurality of first signals based on the position information; and an output unit configured to output the plurality of first signals after monitoring the contents of the header information.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is an explanatory diagram illustrating an example of control information of an OTU1 I/F;

FIG. 7 is a flowchart illustrating an example of a processing operation of an OTU monitor unit relating to an OTU OH monitoring process;

FIG. 8A is an explanatory diagram illustrating an example of the control information during the reading of the OTU monitor unit;

FIG. 8B is an explanatory diagram illustrating an example of the control information during the writing of the OTU monitor unit;

FIG. 10A is an explanatory diagram illustrating an example of the control information during the reading of the ODU monitor unit;

FIG. 10B is an explanatory diagram illustrating an example of the control information during the writing of the ODU monitor unit;

FIG. 12A is an explanatory diagram illustrating an example of the control information during the reading of the ODU insertion unit;

FIG. 12B is an explanatory diagram illustrating an example of the control information during the writing of the ODU insertion unit;

DESCRIPTION OF EMBODIMENTS

Figure 14:
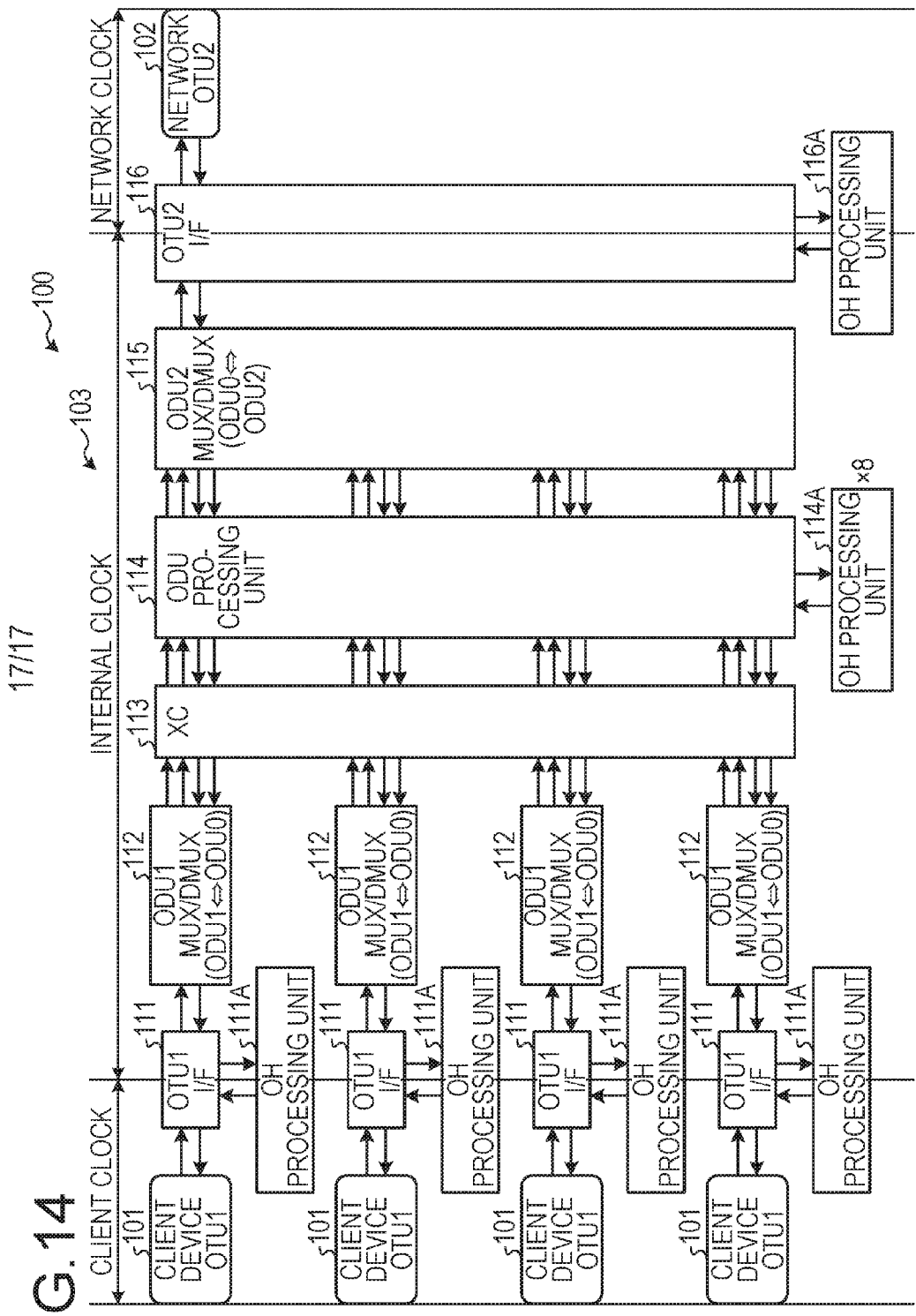
FIG. 14 is an explanatory diagram illustrating an example of a transmission system.

In the transmission apparatus 103 corresponding to OTU1×4 and OTU2×1 illustrated in FIG. 14, the contents of the ODU OH are monitored for each LO-ODU process that outputs the HO-ODU to up to eight LO-ODUs. For example, in order to shift the data of the LO-ODU so as to ensure the synchronization of the data of the LO-ODU for each LO-ODU process, OH processing units are provided in the transmission apparatus 103 including registers corresponding to the number of latency of data×number of parallel data.

Further, in the transmission apparatus 103, the ODU processing unit 114 includes the OH processing units having registers for shifting the data of the ODU for each LO-ODU process of separating the data of the LO-ODU from the HO-ODU in order to rewrite a part or all of the ODU OH.

Furthermore, the transmission apparatus 103, for each OTU1 I/F 111, includes an OH processing unit having registers for shifting the data of each OTU1 until the monitoring of the contents of the OTU OH for each OTU1 is completed when transmitting the OTU1 as the OTU2. Therefore, since a register is required for each OH process, the circuit scale becomes large.

Hereinafter, an embodiment of a transmission apparatus and a transmission method in which the circuit scale required for the OH processing is suppressed will be described in detail with reference to the accompanying drawings. The present embodiment is not intended to limit the disclosure. Examples of the embodiment described below may be adequately combined as long as the combination causes no contradiction.

Embodiment

Figure 1:
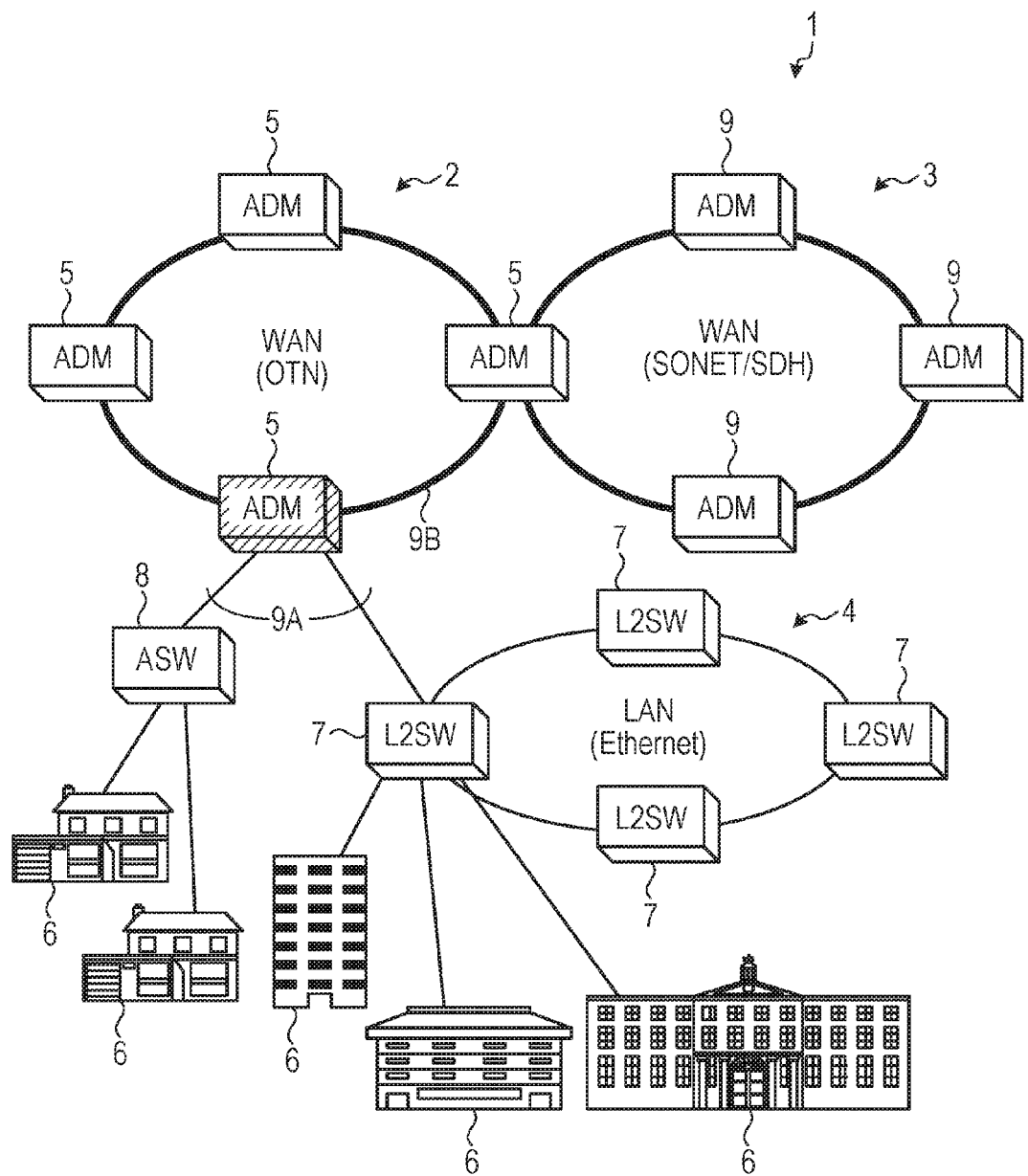
FIG. 1 is an explanatory diagram illustrating an example of a transmission system according to a present embodiment.

FIG. 1 is an explanatory diagram illustrating an example of a transmission system of the present embodiment. A transmission system 1 illustrated in FIG. 1 includes a wide area network (WAN) 2 of an OTN side, and a WAN 3 of a synchronous optical network/synchronous digital hierarchy (SONET/SDH) side. Further, the transmission system 1 includes a local area network (LAN) 4 of an Ethernet (registered trademark) side. In the WAN 2 of the OTN side, a plurality of transmission apparatuses, such as a plurality of optical wavelength multiplexers (hereinafter, simply referred to as "ADM": add drop multiplexer) 5 are connected. In the WAN 3 of the SONET/SDH side, a plurality of ADMs 9 are connected.

In the LAN 4, a plurality of layer2 switches (L2SWs) 7 for connection with clients 6 are connected. The ADM 5 in the WAN 2 of the OTN side is connected, through the client network 9A, to an aggregate switch (ASW) 8 or the L2SW 7 in the LAN 4 to relay communication between the client 6 and the WAN 2.

Figure 2:
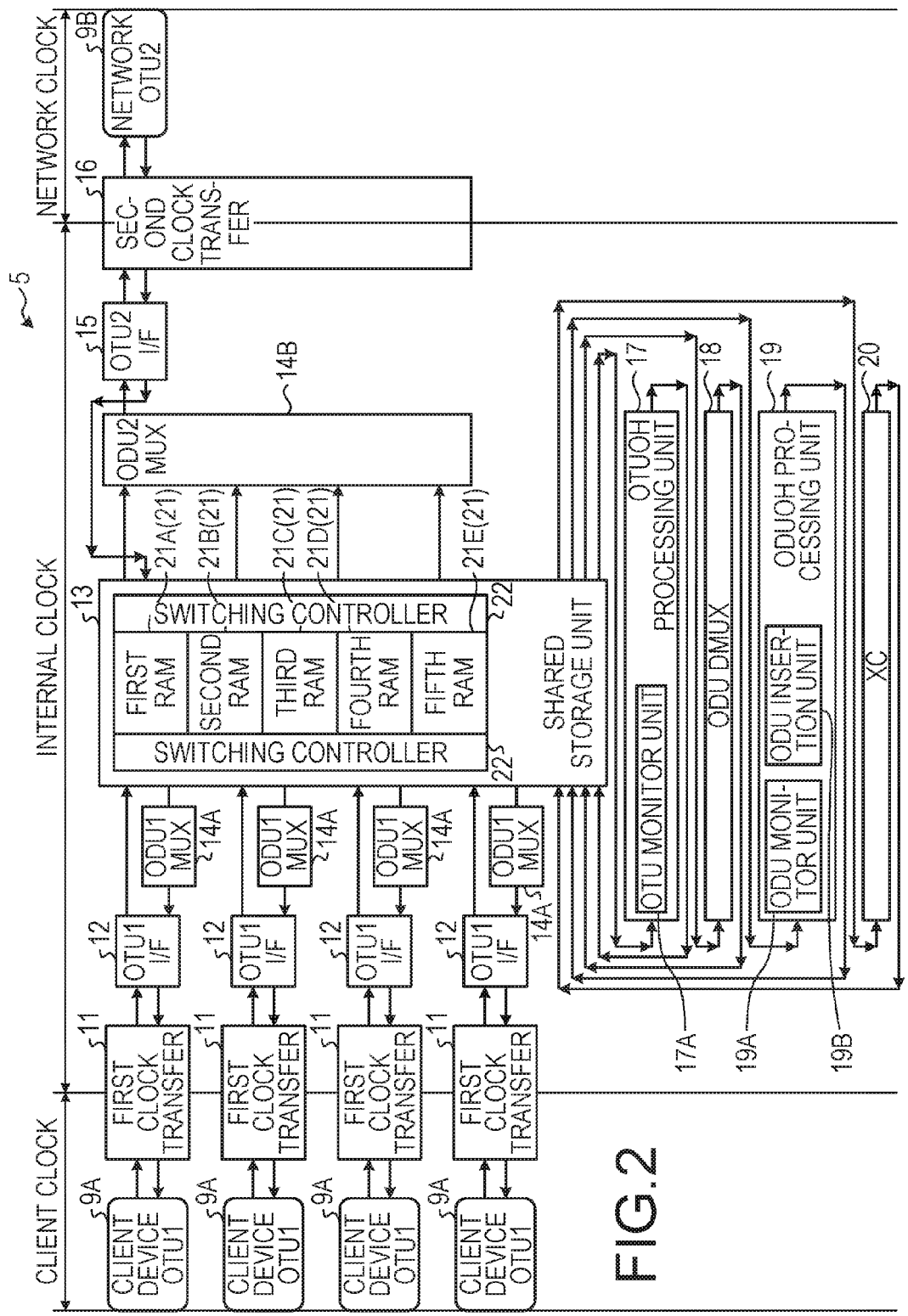
FIG. 2 is a block diagram illustrating an example of an ADM of the present embodiment.

FIG. 2 is a block diagram illustrating an example of the ADM 5. The ADM 5 illustrated in FIG. 2 is, for example, connected between client devices 9A of an OTU1 and a network 9B of an OTU2. The client devices 9A may be recited as devices coupling with the client network 9A. The ADM 5 has four ports that are connected to four client devices 9A of the OTU1 side, and one port that is connected to the network 9B of the OTU2 side. The ADM 5 is a transmission apparatus responding to OTU1×4 ports and OTU2×1 port.

The ADM 5 includes first clock transfers 11, OTU1_I/Fs 12, ODU1_MUXs 14A, a shared storage unit 13, an ODU2_MUX 14B, an OTU2_I/F 15, and a second clock transfer 16. Further, the ADM 5 includes an OTU OH processing unit 17, an ODU_DMUX 18, an ODU_OH processing unit 19, and a XC 20.

The first clock transfer 11 changes the clock speed of a signal interfacing between the client device 9A and the ADM 5. The OTU1_I/F 12 is a communication I/F between the client device 9A and the ADM 5. The second clock transfer 16 changes the clock speed of a signal interfacing between the network 9B and the ADM 5. The OTU2_I/F 15 is a communication I/F between the network 9B and the ADM 5. Further, it is assumed that an internal clock of the ADM 5 is a clock having a speed higher than those of the client clock of the client device 9A of the OTU1 and the network clock of the network 9B of the OTU2.

The shared storage unit 13 is constituted, for example, by a plurality of RAMs 21 of a first RAM 21A to a fifth RAM 21E. The shared storage unit 13 is a work area for executing processes of the OTU_OH processing unit 17, the ODU_DMUX 18, the ODU_OH processing unit 19, and the XC 20.

The OTU_OH processing unit 17 executes an OH processing for the OTU OH of the OTU1 of the OTU1_I/F 12 while executing an OH processing for the OTU OH of the OTU2 of the OTU2_I/F 15. The OTU_OH processing unit 17 includes an OTU monitor unit 17A to monitor the contents of the OTU OH of the OTU1 or OTU2. The ODU_DMUX 18 has a DMUX function of demultiplexing the data of the LO-ODU from the HO-ODU. The ODU_OH processing unit 19 executes an OH processing to insert the contents of the ODU OH while monitoring the contents of the ODU OH of the LO-ODU. The XC 20 rearranges and outputs the data of the LO-ODU to a predetermined output destination on a LO-ODU basis of the ODU_DMUX 18. The ODU_OH processing unit 19 includes an ODU monitor unit 19A and an ODU insertion unit 19B. The ODU monitor unit 19A monitors the contents of the ODU OH. The ODU insertion unit 19B inserts the contents of the ODU OH, and upon detecting a rewrite request for rewriting a part or all of the contents of the ODU OH, rewrites a part or all of the contents of the ODU OH.

The ADM 5 includes four first clock transfers 11, four OTU1_I/Fs 12, and four ODU1_MUXs 14A for connection with four client devices 9A. Further, the ADM 5 includes one OTU2_I/F 15 and one ODU2 MUX for connection with the network 9B.

Figure 3:
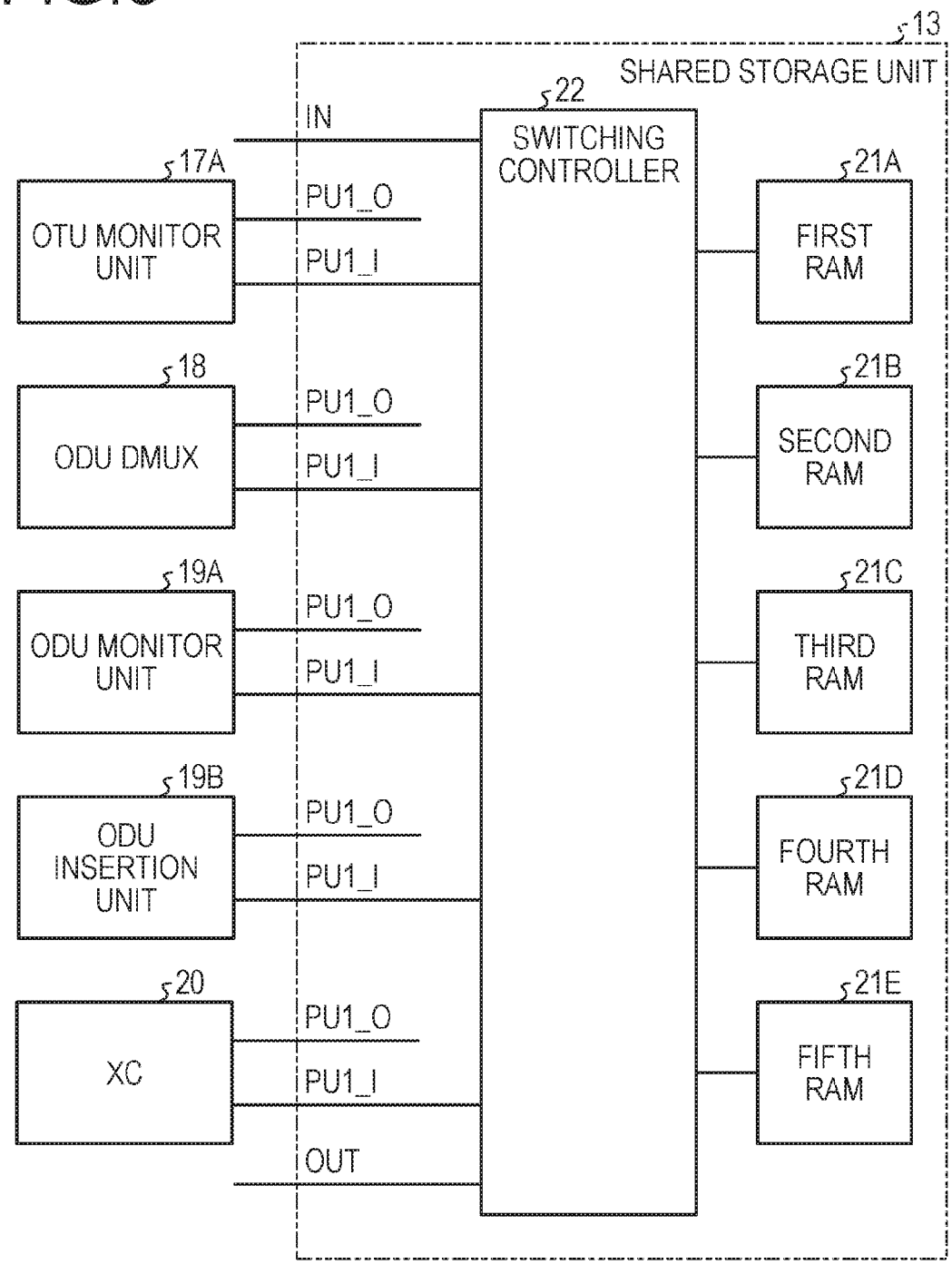
FIG. 3 is an explanatory diagram illustrating an example of a shared storage unit.

FIG. 3 is an explanatory diagram illustrating an example of the shared storage unit 13. The shared storage unit 13 illustrated in FIG. 3 includes a first RAM 21A, a second RAM 21B, a third RAM 21C, a fourth RAM 21D, a fifth RAM 21E, a switching controller 22. The switching controller 22 is switchably connected between the first RAM 21A to fifth RAM 21E and the OTU monitor unit 17A, the ODU_DMUX 18, the ODU monitor unit 19A, the ODU insertion unit 19B and the XC 20. The switching controller 22 sequentially switches the RAM 21 used for each process of the OTU monitor unit 17A, the ODU DMUX 18, the ODU monitor unit 19A, the ODU insertion unit 19B, and the XC 20 to an unused RAM 21.

Figure 4:
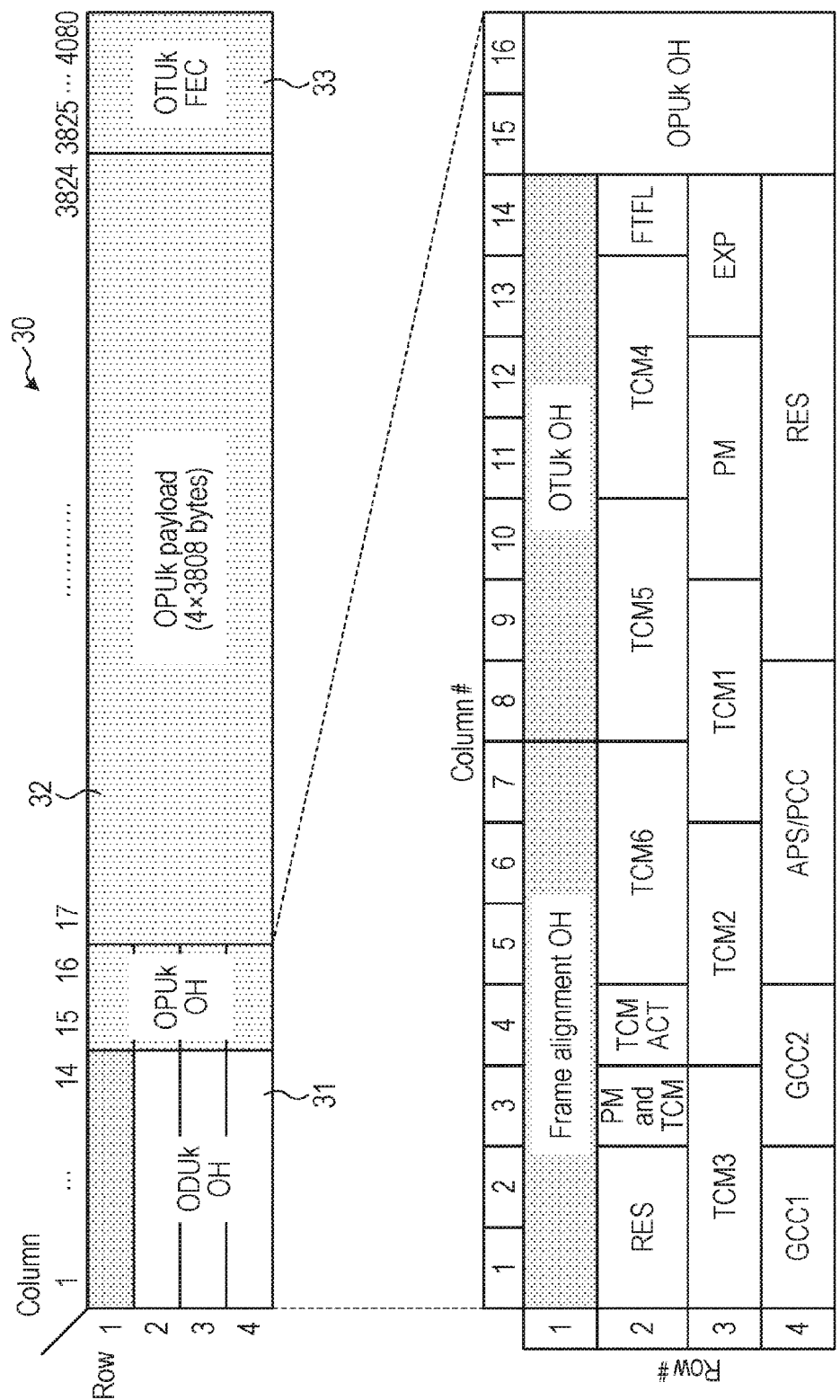
FIG. 4 is an explanatory diagram illustrating an example of a format configuration of the OTU.

FIG. 4 is an explanatory diagram illustrating an example of a format configuration of the OTU. An OTU 30 illustrated in FIG. 4 has an OH area 31, a payload area 32, and an FEC area 33. The OH area 31 has a frame size of 16 bytes from first column to 16th column×4 rows. The payload area 32 has a frame size of 3808 bytes from 17th column to 3824th column×4 rows. The FEC area 33 has a frame size of 256 bytes from 3825th column to 4080th column×4 rows.

The OH area 31 has a frame alignment OH of the first column to 7th column of the first row, an OTU OH of the 8th column to 14th column of the first row, an ODU OH of the first column to 14th column of the second row to the fourth row, and an OPU OH of the 15th column and 16th column of the first row to the fourth row. The OTU OH is an OH area of the OTU. The ODU OH is an OH area of the ODU. The OPU OH is an OH area of the OPU.

The frame alignment OH includes a frame alignment signal (FAS) and a multi-frame alignment signal (MFAS). The FAS is a frame synchronization signal. The MFAS is a multi-frame synchronization signal for detecting a multi-frame synchronization. The OTU OH has section monitoring (SM), general communication channel 0 (GCC0), and reserved for future international standardization (RES). The SM is information indicating a monitoring state between OTU termination points. The GCC0 is information for supporting a communication channel between OTU termination points.

The ODU OH has two RESs, tandem connection monitoring activation (TCMACT), TCM1 to TCM6, fault type and fault location reporting channel (FTFL), path monitoring (PM), and experimental (EXP). Also, the ODU OH has GCC1 and GCC2 and an automatic protection switching/protection communication control (APS/PCC) channel. The TCMACT is information for identifying whether a tandem connection monitoring is in an active state or not. The FTFL is information for notifying a fault type and fault location. The PM is information for monitoring a path status. The EXP is information for identifying whether it is for a test. The APS/PCC is automatic protection switching and a switching communication channel.

The OPU OH has three RESs, three justification controls (JCs), a payload structure identifier (PSI), a negative justification opportunity (NJO), and a positive justification opportunity (PJO). The PSI is information for identifying a payload type. The JC is an adjustment control for adjusting the amount of information in accordance with an increase or decrease of the information in the payload area 32. The PJO is an area for storing increased data when data in the payload area 32 is increased. In the payload area 32 of the OTU1, a TS1 and a TS2 of the ODU0 are stored alternately.

Upon detecting the synchronization of the OTU1, the OTU1 I/F 12 generates data of each byte in the OTU1 and control information including the properties corresponding to the data, based on the OTU OH of the OTU1. FIG. 5 is an explanatory diagram illustrating an example of control information 40 of the OTU1 I/F. The control information 40 illustrated in FIG. 5 associates data of one byte with the properties corresponding to the data. The control information 40 includes an address 41, data 42, data enable 43, payload enable 44, and an OH count value 45 to be managed in association with each other. Further, the properties include, for example, the data enable 43, the payload enable 44, and the OH count value 45. Further, the control information 40 manages the control information (data and properties) of the ODU0 (TS1) and the control information (data and properties) of the ODU0 (TS2) for each address 41.

The address 41 is position information that identifies a data storage position in the RAM 21. The data 42 is data of one byte in the OTU. The data enable 43 is an identifier for identifying whether data of one byte is valid data, which is "1" when the data is valid data, and "0" when the data is invalid data.

The payload enable 44 is an identifier for identifying whether data of one byte is in the payload area 32, which is "1" when the data is in the payload area 32, and "0" when the data is outside the payload area 32. The OH count value 45 is information for identifying data of one byte with a count number from the head position (first row, first column) of the OH.

The ADM 5, by referring to the address 41 from "2" to "9" illustrated in FIG. 5, may be able to identify the data of the OTU1 in which the data enable 43 is "1," the payload enable 44 is "0," and the OH count value 45 is "0" to "15" from the OH area 31. Further, the ADM 5, by referring to address 41 equal to or greater than "10", may be able to identify the data of the OTU1 from the payload area 32 because the data enable 43 is "1" and the payload enable 44 is "1."

Further, the OTU monitor unit 17A monitors the contents of the OTU OH of the SM from the 8th column to 14th column of the first row, and detects a section error by comparing, for example, calculated values and received values of the items of the SM.

The ODU monitor unit 19A monitors the contents of the ODU OH of, for example, the first column to 14th column of the second row, the first column to 14th column of the third row, and the first column to 14th column of the fourth row, and compares received values and expected values, for example, for the FTFL.

The ODU insertion unit 19B replaces a transmission value with the item of TCM6, for example, when the TCM6 is TTI. Also, the ODU insertion unit 19B replaces a transmission value with the item of FTFL, for example, in the case of FTFL. Further, the ODU insertion unit 19B, when transmitting an alarm transfer process, stores the control information to the unused RAM 21 to not only rewrite the contents of the ODU OH, but also replace an alarm transfer or test signal or the like with the payload area 32.

Next, an operation of the ADM 5 of the present embodiment will be described. For example, a description will be given on the operation of the ADM 5 when transmitting the OTU1 from each client device 9A to the network 9B in the OTU2.

The first clock transfer 11 transfers a client clock of the OTU1 from the client device 9A to an internal clock of the ADM 5. The OTU1_I/F 12 detects the synchronization based on the FAS of the OTU OH of the OTU1 which has been transferred to the internal clock. The OTU1_I/F 12 generates the control information 40 from the OTU1. The OTU1_I/F 12 generates the properties for each byte of the OTU1, and stores the control information 40 including the data and the properties of each byte of the OTU1 in the unused RAM 21, for example, the first RAM 21A, in the shared storage unit 13. Further, the control information 40 of a total of four OTU1s from each OTU1_I/F 12 is stored in the first RAM 21A. Further, the RAM 21 becomes a writable unused RAM 21 because the control information 40 is eliminated from the RAM 21 when reading the control information 40.

The OTU monitor unit 17A of the OTU_OH processing unit 17 reads the control information 40 stored in the first RAM 21A, and monitors the contents of the OTU_OH of each OTU1 based on the data and the properties of the OTU1 in the read control information 40. The OTU monitor unit 17A stores the control information 40 in the unused RAM 21 such as, for example, the second RAM 21B. Further, the control information 40 of a total of four OTU1s is stored in the second RAM 21B.

The ODU_DMUX 18 separates each OTU1 of the control information 40 read from the second RAM 21B into the data of each ODU0, and stores the control information 40 including the data of each ODU0 in the unused RAM 21 such as, for example, the third RAM 21C. Further, the control information 40 of a total of eight ODU0s is stored in the third RAM 21C.

The ODU monitor unit 19A of the OTU_OH processing unit 19 reads the control information 40 stored in the third RAM 21C, and monitors the contents of the OTU OH of each OTU0 based on the data and the properties of the OTU1 in the read control information 40. The ODU monitor unit 19A stores the control information 40 in the unused RAM 21 such as, for example, the fourth RAM 21D. Further, the control information 40 of a total of eight ODU0s is stored in the fourth RAM 21D.

The ODU insertion unit 19B of the OTU_OH processing unit 19 reads the control information 40 stored in the fourth RAM 21D, and determines whether a rewrite request of the ODU OH has been detected. When a rewrite request of the ODU OH of the ODU0 has been detected, the ODU insertion unit 19B rewrites the contents of the ODU OH of the ODU0 to update the contents of the rewritten ODU OH. The ODU insertion unit 19B stores the control information 40 including the data of the updated ODU OH in the unused RAM 21 such as, for example, the fifth RAM 21E. Further, the control information 40 of a total of eight ODU0s is stored in the fifth RAM 21E.

The XC 20 reads each of the total of eight ODU0s in the control information 40 stored in the fifth RAM 21E, rearranges the data of each ODU0 to a predetermined output destination, and outputs the data of each ODU0 to the ODU2_MUX 14B. The ODU2_MUX 14B stores the data of eight ODU0s in the ODU2, and outputs the ODU2 to the OTU2_I/F 15 while being stored in the OTU2. The OTU2_I/F 15 inserts the FEC value into the FEC area 33 of the OTU2 while inserting the OTU OH into the OH area 31 of the OTU2. Further, the OTU2_I/F 15 outputs the OTU2 to the second clock transfer 16. The second clock transfer 16 transfers the OTU2 from the internal clock of the ADM 5 to the network clock, and outputs the OTU2 to the network 9B.

Next, an operation of the ADM 5 when transmitting the OTU2 from the network 9B as the OTU1 to each client device 9A will be described.

The second clock transfer 16 transfers the network clock of the OTU2 from the network 9B to the internal clock in the ADM5. The OTU2_I/F 15 detects the synchronization based on the FAS of the OTU OH of the OTU2 which has been transferred to the internal clock. The OTU2_I/F 15 generates the control information 40 from the OTU2. The OTU2_I/F 15 generates the properties for each byte of the OTU2, and stores the control information 40 including the data and the properties of each byte of the OTU2 in the unused RAM 21 such as, for example, the first RAM 21A, in the shared storage unit 13. Further, the control information 40 of one OTU2 from the OTU2_I/F 15 is stored in the first RAM 21A.

The OTU monitor unit 17A reads the control information 40 of the OTU2 stored in the first RAM 21A, and monitors the contents of the OTU OH in the OTU2 based on the data and the properties of the OTU2 in the read control information 40. The OTU monitor unit 17A stores the control information 40 in the unused RAM 21 such as, for example, the second RAM 21B. Further, the control information 40 of one OTU2 is stored in the second RAM 21B.

The ODU_DMUX 18 separates the OTU2 of the control information 40 read from the second RAM 21B into the data of eight ODU0s, and stores the control information 40 including each ODU0 in the unused RAM 21 such as, for example, the third RAM 21C. Further, the control information 40 of a total of eight ODU0s is stored in the third RAM 21C.

The ODU monitor unit 19A reads the control information 40 stored in the third RAM 21C, and monitors the contents of the ODU OH of each ODU0 based on the data and the properties of the ODU0 in the read control information 40. The ODU monitor unit 19A stores the control information 40 in the unused RAM 21 such as, for example, the fourth RAM 21D. Further, the control information 40 of a total of eight ODU0s is stored in the fourth RAM 21D.

The ODU insertion unit 19B reads the control information 40 stored in the fourth RAM 21D, and determines whether a rewrite request of the ODU OH has been detected. The rewrite request is, for example, an update request. When a rewrite request of the ODU OH of the ODU0 has been detected, the ODU insertion unit 19B rewrites the contents of the ODU OH of the corresponding ODU0 to update the contents of the rewritten ODU OH. The ODU insertion unit 19B stores the control information 40 including the data of the updated ODU OH in the unused RAM 21 such as, for example, the fifth RAM 21E. Further, the control information 40 of a total of eight ODU0s is stored in the fifth RAM 21E.

The XC 20 reads each of the total of eight ODU0s in the control information 40 stored in the fifth RAM 21E, rearranges each ODU0 to a predetermined output destination, and outputs the data of each ODU0 to the ODU1_MUX 14A. The ODU1_MUX 14A stores two ODU0s in the ODU1, and outputs the ODU1 to the OTU1_I/F 12 while storing in the payload area 32 of the OTU1. The OTU1_I/F 12 inserts the FEC value into the FEC area 33 of the OTU1 while inserting the OTU OH into the OH area 31 of the OTU1. Further, the OTU1_I/F 12 outputs the OTU1 to the first clock transfer 11. The first clock transfer 11 transfers the OTU1 from the internal clock to the client clock, and outputs the OTU1 to the client device 9A.

As described above, the ADM 5 monitors the contents of the OTU OH of the OTU1 by using the data and the properties of each OTU1 stored in a single RAM 21. As a result, since four registers may be shared by a single RAM 21 as in the conventional case, it is possible to suppress the circuit scale.

The ADM 5 monitors the contents of the ODU OH of the ODU0 by using the data and the properties of each ODU0 stored in a single RAM 21. As a result, since eight registers may be shared by a single RAM 21 as in the conventional case, it is possible to suppress the circuit scale.

Upon detecting a rewrite request of the ODU OH of the ODU0, the ADM 5 rewrites the contents of the ODU OH of the ODU0 by using the data of each ODU0 stored in a single RAM 21. As a result, since eight registers may be shared by a single RAM 21 as in the conventional case, it is possible to suppress the circuit scale.

Figure 6:
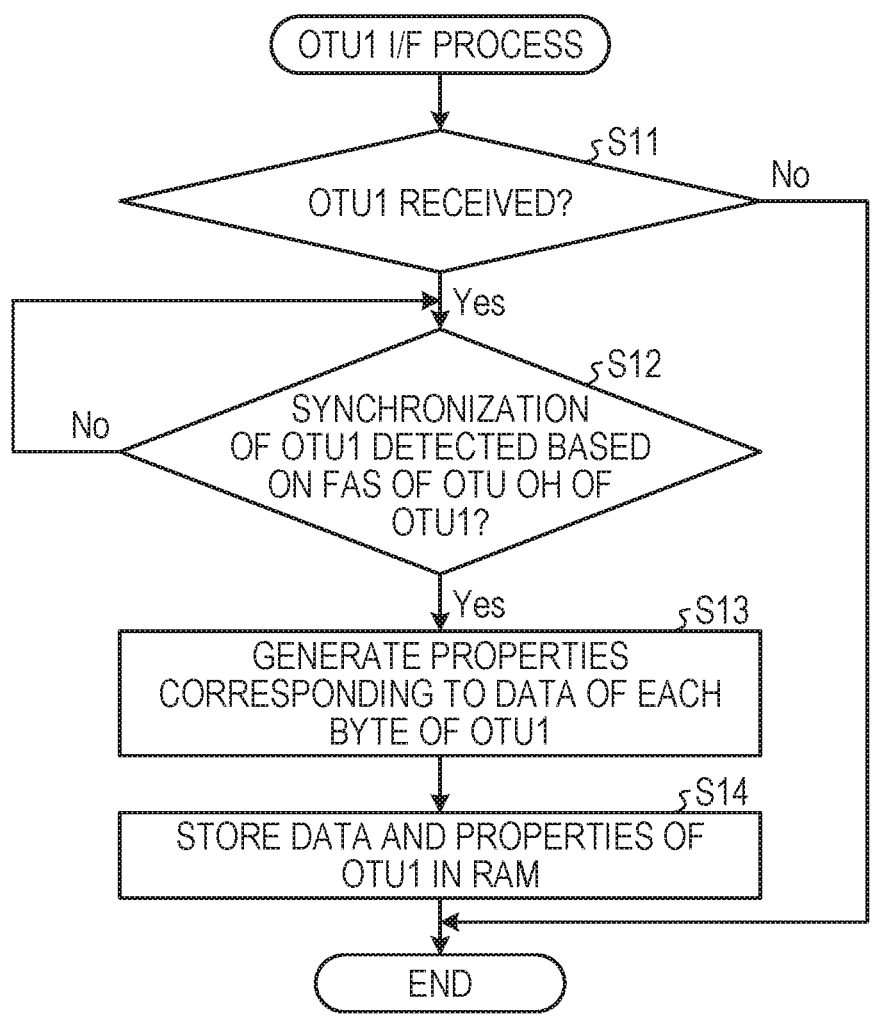
FIG. 6 is a flowchart illustrating an example of a processing operation of the OTU1 I/F relating to an OTU1 I/F process.

FIG. 6 is a flowchart illustrating an example of a processing operation of the OTU1_I/F 12 relating to an OTU1 I/F process. The OTU1 I/F process illustrated in FIG. 6 is a process of storing the control information 40 including the data and the properties of each byte of the OTU1 in the unused RAM 21 when receiving the OTU1.

The OTU1_I/F 12 determines whether the OTU1 has been received (operation S11). When it is determined that the OTU1 has been received ("Yes" in operation S11), the OTU1_I/F 12 determines whether the synchronization of the OTU1 has been detected based on the FAS of the OTU OH of the OTU1 (operation S12).

The OTU1_I/F 12 generates the properties corresponding to the data of each byte of the OTU1 (operation S13). Further, the OTU1_I/F 12 generates the data enable 43, the payload enable 44, and the OH count value 45 for each data of one byte. The OTU1_I/F 12 stores the control information 40 including the data and the properties of each byte of the OTU1 in the unused RAM 21 (operation S14), and ends the processing operation illustrated in FIG. 6.

When it is determined that the OTU1 has not been received ("No" in operation S11), the OTU1_I/F 12 ends the processing operation illustrated in FIG. 6. When it is determined that the synchronization of the OTU1 has not been detected ("No" in operation S12), the OTU1 I/F 12 proceeds to operation S12 in order to monitor whether the synchronization of the OTU1 has been detected.

In the OTU1 I/F process illustrated in FIG. 6, when receiving the OTU1, the data and the properties of each byte are generated based on the data in the OTU1, and the control information 40 including the data and the properties of each byte is stored in the RAM 21.

Further, in the OTU1 I/F process illustrated in FIG. 6, the control information 40 of the OTU1 is generated by using the OTU1_I/F 12, and the control information 40 is stored in the RAM 21, but it is also applicable to the OTU2_I/F 15. In this case, the control information 40 of the OTU2 may be generated and the control information 40 may be stored in the RAM 21.

FIG. 7 is a flowchart illustrating an example of a processing operation of the OTU monitor unit 17A relating to an OTU OH monitoring process. The OTU OH monitoring process illustrated in FIG. 7 is a process of monitoring the contents of the OTU OH in each OTU1 based on the control information 40 stored in the RAM 21.

The OTU monitor unit 17A reads the control information 40 including the data and the properties of the OTU1 stored in the RAM 21 (operation S21), and refers to the data enable 43 and the payload enable 44 of the properties for each specified data. Further, the specified data are sequentially designated for each data 42 of the OTU1 of the control information 40. The OTU monitor unit 17A determines whether the data enable 43 of the specified data is "1" and the payload enable 44 of the specified data is "0" (operation S22).

The OTU monitor unit 17A determines that the specified data is considered as valid data in the OH area 31 when it is determined that the data enable 43 of the specified data is "1" and the payload enable 44 of the specified data is "0" ("Yes" in operation S22). Further, when it is determined that the specified data is valid data in the OH area 31, the OTU monitor unit 17A checks the contents of the OTU OH based on the OH count value 45 of the specified data (operation S23). Further, the OTU monitor unit 17A may identify the contents of the OTU OH of the specified data based on the OH count value 45.

After checking the contents of the OTU OH of the specified data, the OTU monitor unit 17A determines whether the OH count value 45 of the specified data exceeds a first OH threshold (operation S24). Further, the first OH threshold corresponds to an OH count value greater than the OH head (first row, first column) to the 14th column of the first row, and is, for example, an area of the ODU OH of the 15th column of the first row.

When it is determined that the OH count value 45 of the specified data exceeds the first OH threshold ("Yes" in operation S24), the OTU monitor unit 17A determines whether there is a staff process (operation S25). Further, the OTU monitor unit 17A determines whether there is a staff process by majority processing of three JCs in the OPU OH.

When it is determined that there is a staff process ("Yes" in operation S25), the OTU monitor unit 17A executes a staff process of writing staff data in the payload area 32 of the OTU1 (operation S26). The OTU monitor unit 17A rewrites the contents of the data enable 43 and the payload enable 44 based on the execution result of the staff process, and updates the control information 40 (operation S27). Furthermore, after updating the control information 40, the OTU monitor unit 17A stores the control information including the data and the properties of each byte of the OTU1 in the unused RAM 21 (operation S28), and ends the processing operation illustrated in FIG. 7.

When it is determined that the data enable 43 of the specified data is not "1" and the payload enable 44 of the specified data is not "0" ("No" in operation S22), the OTU monitor unit 17A determines whether the OH count value 45 of the specified data exceeds the first OH threshold, and proceeds to operation S24.

When it is determined that the OH count value 45 of the specified data does not exceed the first OH threshold ("No" in operation S24), the OTU monitor unit 17A determines that the specified data is in the OH area 31. When it is determined that the specified data is in the OH area 31, the OTU monitor unit 17A determines whether the data enable 43 of the specified data is "1" and the payload enable 44 of the specified data is "0," and proceeds to operation S22.

When it is determined that there is no staff process ("No" in operation S25), the OTU monitor unit 17A stores the control information 40 in the unused RAM 21, and proceeds to operation S28.

The OTU monitor unit 17A reads the control information 40 stored in the RAM 21, and monitors the contents of the OTU OH of the specified data based on the OH count value 45 if the specified data is valid data in the OH area 31. As a result, even without providing a register for each OTU1 I/F as in the conventional case, the OTU monitor unit 17A reads the control information 40 stored in a single RAM 21, and checks the contents of the OTU OH of each OTU1.

Further, when it is determined that there is a staff process, the OTU monitor unit 17A executes the staff process, updates the control information 40 by performing the rewriting of the data and the properties, and stores the updated control information 40 in the unused RAM 21. As a result, even without providing a register for each OTU1 I/F as in the conventional case, the OTU monitor unit 17A reads the control information 40 stored in a single RAM 21 and updates the payload area of each OTU1 when it is determined that there is a staff process.

FIG. 8A is an explanatory diagram illustrating an example of the control information 40 during the reading of the OTU monitor unit 17A. FIG. 8B is an explanatory diagram illustrating an example of the control information 40 during the writing of the OTU monitor unit 17A. As illustrated in FIGS. 8A and 8B, the OTU monitor unit 17A rewrites "0" of the data enable 43 of the TS2 of "xxx" of the address 41 to "1" by the staff process.

Figure 9:
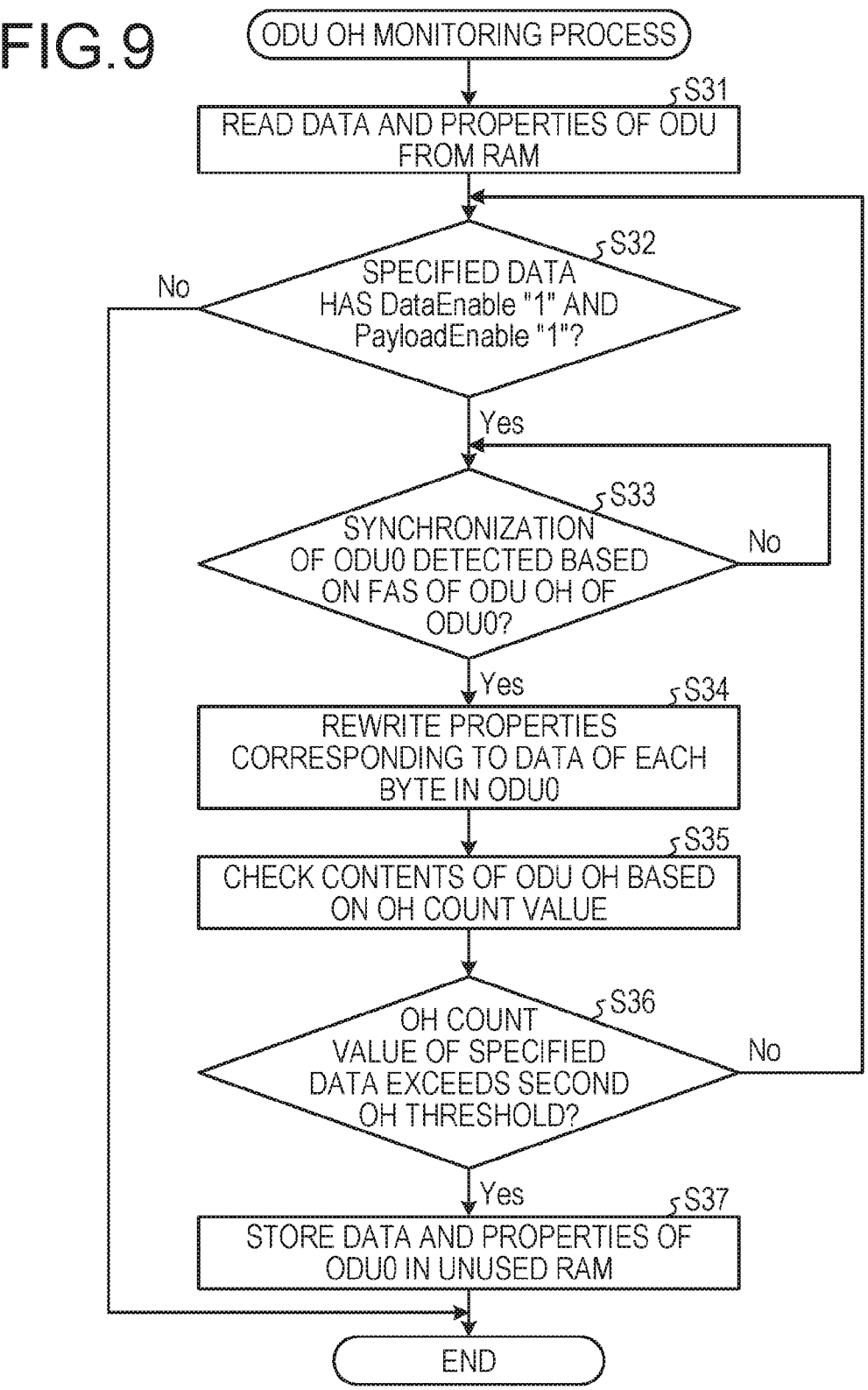
FIG. 9 is a flowchart illustrating an example of a processing operation of an ODU monitor unit relating to an ODU OH monitoring process.

FIG. 9 is a flowchart illustrating an example of the processing operation of the ODU monitor unit 19A relating to the ODU OH monitoring process. The ODU OH monitoring process illustrated in FIG. 9 is a process of monitoring the contents of the ODU OH of the ODU0 for each LO-ODU based on the control information 40 stored in the RAM 21.

The ODU monitor unit 19A reads the control information 40 stored in the RAM 21 (operation S31), and determines whether the data enable 43 of the specified data is "1" and the payload enable 44 of the specified data is "1" (operation S32). When it is determined that the data enable 43 of the specified data is not "1" and the payload enable 44 of the specified data is not "1" ("No" in operation S32), the ODU monitor unit 19A determines that the specified data is not in the OH area 31, and ends the processing operation illustrated in FIG. 9. When it is determined that the data enable 43 of the specified data is "1" and the payload enable 44 of the specified data is "1" ("Yes" in operation S32), the ODU monitor unit 19A determines whether the synchronization of the ODU0 has been detected based on the FAS of the ODU OH of the ODU0 in the control information 40 (operation S33).

When it is determined that the synchronization of the ODU0 has been detected ("Yes" in operation S33), the ODU monitor unit 19A rewrites the properties corresponding to the data of each byte in the ODU0 (operation S34).

After the processing of operation S34, the ODU monitor unit 19A checks the contents of the ODU OH based on the OH count value 45 of the specified data (operation S35). Further, the ODU monitor unit 19A may be able to identify the contents of the ODU OH of the specified data based on the OH count value 45.

After checking the contents of the ODU OH of the specified data, the ODU monitor unit 19A determines whether the OH count value 45 of the specified data exceeds a second OH threshold (operation S36). Further, the ODU OH is the first column to 14th column of the second row, the first column to 14th column of the third row, and the first column to 14th column of the fourth row in the OTU frame. The second OH threshold is, for example, an OH count value greater than the head position (first column of the first row) of the OH to the 14th column of the fourth row.

When it is determined that the OH count value 45 of the specified data exceeds the second OH threshold ("Yes" in operation S36), the ODU monitor unit 19A stores the control information 40 in the unused RAM 21 (operation S37), and ends the processing operation illustrated in FIG. 9.

When it is determined that the synchronization of the ODU0 has not been detected ("No" in operation S33), the ODU monitor unit 19A determines whether the synchronization of the ODU0 has been detected, and proceeds to operation S33.

When it is determined that the OH count value 45 does not exceed the second OH threshold ("No" in operation S36), the ODU monitor unit 19A proceeds to operation S32.

The ODU monitor unit 19A reads the control information stored in the RAM 21, and when the specified data is valid data in the OH area 31, checks the contents of the ODU OH of the specified data based on the OH count value 45. As a result, even without providing a register for each LO-ODU as in the conventional case, the OTU monitor unit 17A reads the control information 40 stored in a single RAM 21, and checks the contents of the ODU OH of each ODU0.

FIG. 10A is an explanatory diagram illustrating an example of the control information during the reading of the ODU monitor unit 19A. FIG. 10B is an explanatory diagram illustrating an example of the control information during the writing of the ODU monitor unit 19A. The ODU monitor unit 19A rewrites the payload enable 44 and the OH count value 45 of the TS1 and TS2 at "10" and after of the address 41 to change the control information from FIGS. 10A to 10B. Further, the ODU monitor unit 19A rewrites the data enable 43 of the TS1 and TS2 at "2" to "9" of the address 41 to "0" to change the control information from FIGS. 10A to 10B.

Figure 11:
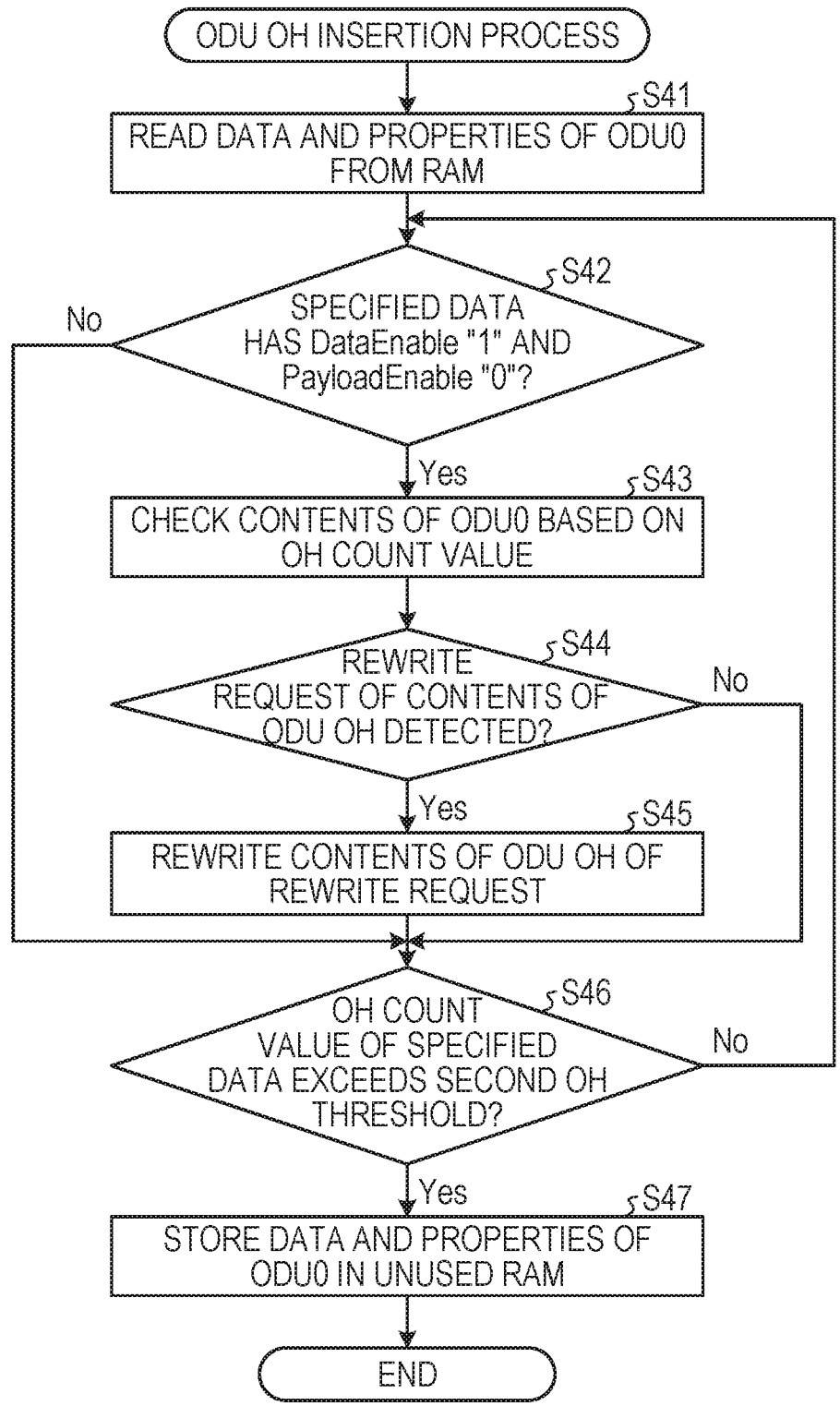
FIG. 11 is a flowchart illustrating an example of a processing operation of an ODU insertion unit relating to an ODU OH insertion process.

FIG. 11 is a flowchart illustrating an example of a processing operation of the ODU insertion unit 19B relating to an ODU OH insertion process. The ODU OH insertion process illustrated in FIG. 11 is a process of rewriting the contents of the ODU OH upon detecting a rewrite request from the contents of the ODU OH of each ODU0 for each LO-ODU based on the control information 40 stored in the RAM 21.

The ODU insertion unit 19B in FIG. 11 reads the control information 40 stored in the RAM 21 (operation S41), and determines whether the data enable 43 of the specified data is "1" and the payload enable 44 of the specified data is "0" (operation S42).

The ODU insertion unit 19B determines that the specified data is valid data in the ODU OH when it is determined that the data enable 43 of the specified data is "1" and the payload enable 44 of the specified data is "0" ("Yes" in operation S42). Further, when it is determined that the specified data is valid data in the ODU OH, the ODU insertion unit 19B checks the contents of the ODU OH based on the OH count value 45 (operation S43).

The ODU insertion unit 19B determines whether a rewrite request of the contents of the ODU OH has been detected (operation S44). When a rewrite request of the contents of the ODU OH has been detected ("Yes" in operation S44), the ODU insertion unit 19B rewrites the contents of the ODU OH of the rewrite request (operation S45). As a result, the ODU insertion unit 19B generates the properties according to the rewriting of the contents of the ODU OH. The ODU insertion unit 19B determines whether the OH count value 45 exceeds the second OH threshold (operation S46).

When it is determined that the OH count value 45 exceeds the second OH threshold ("Yes" in operation S46), the ODU insertion unit 19B stores the control information 40 in the unused RAM 21 (operation S47), and ends the processing operation illustrated in FIG. 11.

When it is determined that the OH count value 45 does not exceed the second OH threshold ("No" in operation S46), the ODU insertion unit 19B determines whether the data enable 43 of the specified data is "1" and the payload enable 44 of the specified data is "0," and proceeds to operation S42.

When it is determined that the data enable 43 of the specified data is not "1" and the payload enable 44 of the specified data is not "0" ("No" in operation S42), the ODU insertion unit 19B determines whether the OH count value 45 exceeds the second OH threshold, and proceeds to operation S46. When it is determined that a rewrite request of the contents of the ODU OH has not been detected ("No" in operation S44), the ODU insertion unit 19B determines whether the OH count value 45 exceeds the second OH threshold, and proceeds to operation S46.

The ODU insertion unit 19B in FIG. 11 reads the control information 40 stored in the RAM 21, and upon detecting a rewrite request of the contents of the ODU OH, rewrites the contents of the ODU OH for each LO-ODU. As a result, the ODU insertion unit 19B is able to read the control information 40 stored in a single RAM 21 and updates the contents of the ODU OH of each ODU0 without requiring a register for each LO-ODU as in the conventional case.

FIG. 12A is an explanatory diagram illustrating an example of the control information during the reading of the ODU insertion unit 19B. FIG. 12B is an explanatory diagram illustrating an example of the control information during the writing of the ODU insertion unit 19B. The ODU insertion unit 19B rewrites and updates the data by rewriting the contents of the ODU OH, and does not change the contents of the properties as illustrated in FIGS. 12A and 12B.

Figure 13:
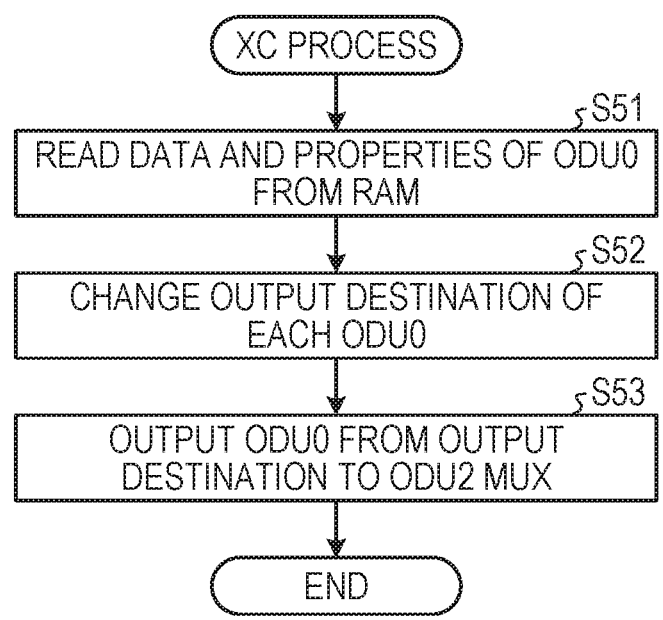
FIG. 13 is a flowchart illustrating an example of a processing operation of the XC 20 relating to an XC process.

FIG. 13 is a flowchart illustrating an example of a processing operation of the XC 20 relating to an XC processing. The XC processing illustrated in FIG. 13 is a process of reading the control information 40 stored in the RAM 21 and rearranging each ODU0 to a predetermined output destination.

As illustrated in FIG. 13, the XC 20 reads the control information 40 from the RAM 21 (operation S51), rearranges each ODU0 to a predetermined output destination (operation S52), outputs the data for each ODU0 from the output destination to the ODU2 MUX 14B (operation S53), and ends the processing operation.

In FIG. 13, the XC 20 reads the control information 40 stored in the RAM 21, rearranges the data of each ODU0 to a predetermined output destination, and outputs the rearranged ODU0 to the ODU2 MUX 14B.

The OTU monitor unit 17A of the ADM 5 of the present embodiment generates the properties indicating the position of each OH from the OTU1 storing a plurality of ODU0s, and sequentially stores the data and the OH position of each OTU1 in a single unused RAM 21. The ODU monitor unit 19A reads the properties and the data of each ODU0 stored in a single RAM 21, and checks the contents of the ODU OH of the read data of each ODU0. As a result, even without providing a register for each LO-ODU as in the conventional case, the ODU monitor unit 19A is able to read each ODU0 and the properties stored in a single RAM 21, and checks the contents of the ODU OH of each ODU0.

Upon detecting a rewrite request of the ODU OH of the ODU0 stored in the RAM 21, the ODU insertion unit 19B of the ADM 5 updates the contents of the ODU OH of the ODU0 stored in the RAM 21 to update the ODU0 in a single RAM 21. As a result, without requiring a register for each LO-ODU as in the conventional case, the ODU insertion unit 19B is able to read each ODU0 and the properties stored in a single RAM 21 and update the contents of the ODU OH of each ODU0.

The ADM 5 transfers the clock to the internal clock between the ADM 5 and the client device 9A of the OTU1 in the first clock transfer 11, and at the same time, transfers the clock to the internal clock between the ADM 5 and the network 9B of the OTU2 in the second clock transfer 16. As a result, in the ADM 5, since different clocks of the OTU are transferred to a common internal clock, there is no asynchronous part inside the apparatus, and for example, loop-back of data is easily carried out by smoothly performing the separation and multiplexing process of the OTU.

In a conventional ADM, for example, four FPGAs having a 360 k gate size are employed when performing a LO-ODU process for eight ports. In contrast, in the ADM 5 of the present embodiment, since the RAM 21 is used, it is implemented with one FPGA having a 500 k gate size.

Although the number of the RAMs 21 is five in the above embodiment, it is not limited to five, but at least one RAM 21 may be provided. For convenience of explanation, it has been described in the above embodiment that the control information is read from the first RAM 21A, and stored in the unused second RAM 21B when processing the read control information. However, it is not limited to the second RAM 21B, and it may be an unused RAM.

In the above embodiment, the ADM 5 corresponding to OTU1-OTU2 has been exemplified, but it is not limited thereto, and may be applied to the ADM 5 corresponding to OTU1-OTU3, an OTU combination pattern or the like.

In the above-described embodiment, the client device 2 of the OTU1 has been exemplified as a client device, but it is not limited to the OTU, and it may be connected to, for example, a client device such as a LAN and SON ET.

Further, in the ADM 5 of the above-described embodiment, an OTU in which the LO-ODU is multiplexed by being nested in two stages has been exemplified, but it is not limited to two stages, and is also applicable to an OTU in which the ODU is multiplexed by being nested in three or more stages.

In the ADM 5 of the above embodiment, the HO-ODU storing the LO-ODU has been multiplexed by being nested in a plurality of stages, but the combination pattern of ODU types may be appropriately changed.

The constituent elements of each part are not necessarily required to be configured physically as illustrated. In other words, a specific mode of distribution and integration of each part is not limited to the illustrated one, and all or a part thereof may be configured to be functionally or physically distributed or integrated as arbitrary units depending on various loads or use conditions.

Further, all or a part of various processing functions performed by each device may be executed on a central processing unit (CPU) (or a microcomputer such as a Micro Processing Unit (MPU) and a micro controller unit (MCU)). Further, it goes without saying that all or a part of various processing functions may be executed on a program analyzed and executed by a CPU (or a microcomputer such as MPU and MCU), or on hardware using a wired logic.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A transmission apparatus comprising:
   a generator configured to generate data of each byte in each of a plurality of first signals, from a second signal nesting the plurality of first signals, and to generate control information including properties corresponding to the data based on header information of each of the plurality of first signals;
   a storage configured to store the control information generated by the generator and the plurality of first signals;
   a monitor configured to read the control information and the plurality of first signals stored in the storage, to monitor the header information of each of the plurality of first signals, to determine whether the data of each byte in each of the plurality of first signals is valid data based on a data enable identifier and a payload enable identifier included in the control information, and to check contents of the header information of each of the plurality of first signals based on a count value included in the control information when it is determined that the data is valid data; and
   an output unit configured to output the plurality of first signals after monitoring the contents of the header information.

2. The transmission apparatus according to claim 1, further comprising:
one or more processors configured to:
determine whether an update request of the header information regarding the plurality of first signals stored in the storage is detected; and
update the control information and a first signal of the plurality of first signals to be updated, stored in the storage, when the update request of the header information is detected,
wherein the output unit outputs the plurality of first signals after the updating.

3. The transmission apparatus according to claim 1, wherein the output unit reads the plurality of first signals stored in the storage, and outputs a third signal nesting the plurality of first signals.

4. The transmission apparatus according to claim 3, further comprising:
a first clock transfer configured to transfer a clock of the second signal to an internal clock; and
a second clock transfer configured to transfer a clock of the third signal from an internal clock to an external clock.

5. A transmission method comprising:
generating data of each byte in a plurality of first signals, from a second signal nesting the plurality of first signals;
generating control information including properties corresponding to the data based on header information of each of the plurality of first signals;
storing the control information generated and the plurality of first signals in a storage;
reading the control information and the plurality of first signals stored in the storage;
monitoring contents of the header information of the plurality of first signals, determining whether the data of each byte in each of the plurality of first signals is valid data based on a data enable identifier and a payload enable identifier included in the control information, and checking the contents of the header information of each of the plurality of first signals based on a count value included in the control information when it is determined that the data is valid data; and
outputting the plurality of first signals after monitoring the contents of the header information.

6. A transmission apparatus comprising:
a memory: and
one or more processors coupled to the memory, the one or more processors being configured to:
generate data of each byte in each of a plurality of first signals, from a second signal nesting the plurality of first signals, and generate control information including properties corresponding to the data based on header information of each of the plurality of first signals,
store the control information generated by the generator and the plurality of first signals in the memory,
read the control information and the plurality of first signals stored in the memory, monitor the header information of each of the plurality of first signals, determine whether the data of each byte in each of the plurality of first signals is valid data based on a data enable identifier and a payload enable identifier included in the control information, and check contents of the header information of each of the plurality of first signals based on a count value included in the control information when it is determined that the data is valid data, and
output the plurality of first signals after monitoring the contents of the header information.

* * * * *